US012344020B2

(12) United States Patent
Ludwig et al.

(10) Patent No.: US 12,344,020 B2
(45) Date of Patent: Jul. 1, 2025

(54) METHOD FOR LACQUERING SUBSTRATES, AND LACQUERED SUBSTRATES

(71) Applicant: ACTEGA Schmid Rhyner AG, Adliswil-Zürich (CH)

(72) Inventors: Peter Eladio Ludwig, Zürich (CH); Roland Rüedi, Wädenswil (CH); Dieter Wyler, Kloten (CH); Dirk Schlatterbeck, Friltschen (CH)

(73) Assignee: ACTEGA Schmid Rhyner AG, Adliswil-Zürich (CH)

( * ) Notice: Subject to any disclaimer, the term of this patent is extended or adjusted under 35 U.S.C. 154(b) by 29 days.

(21) Appl. No.: 17/614,302

(22) PCT Filed: May 25, 2020

(86) PCT No.: PCT/EP2020/064438
§ 371 (c)(1),
(2) Date: Nov. 24, 2021

(87) PCT Pub. No.: WO2020/239692
PCT Pub. Date: Dec. 3, 2020

(65) Prior Publication Data

US 2022/0266615 A1 Aug. 25, 2022

(30) Foreign Application Priority Data

May 28, 2019 (DE) ........................ 10 2019 114 277

(51) Int. Cl.
*B41M 5/00* (2006.01)
*B41M 5/50* (2006.01)
(Continued)

(52) U.S. Cl.
CPC .......... *B41M 5/0011* (2013.01); *B41M 5/502* (2013.01); *B41J 2/01* (2013.01); *B41M 1/00* (2013.01)

(58) Field of Classification Search
CPC ...... B41M 5/0011; B41M 5/502; B41M 1/00; B41J 2/01
(Continued)

(56) References Cited

U.S. PATENT DOCUMENTS 6,218,004 B1 4/2001 Shaw et al.
6,465,078 B1 10/2002 Kawai et al.
(Continued)

FOREIGN PATENT DOCUMENTS

AU 2006268654 A1 1/2007
CN 1213343 A 4/1999
(Continued)

OTHER PUBLICATIONS

Authorized Officer: Ponsaud, Philippe, English translation of the International Preliminary Report on Patentability issued in PCT application No. PCT/EP2020/064438, Jul. 28, 2021, 6 pp.
(Continued)

*Primary Examiner* — Betelhem Shewareged
(74) *Attorney, Agent, or Firm* — Kaplan Breyer Schwarz, LLP

(57) ABSTRACT

A method of producing a printed product, wherein a formulation for production of a first layer as sealing layer is applied to the substrate and the formulation has at least one monomer, oligomer or prepolymer having at least one crosslinkable functional group. Subsequently, the first layer is cured and a second layer is applied at least to regions of the first layer, wherein the second layer has a coherent surface in the printed regions. Further, a printed product having a substrate, a first layer and a second layer, wherein the first layer and the second layer comprise an organic crosslinked lacquer and have a coherent surface, and wherein the first layer is transparent and has a layer thickness in the range from 1 to 10 µm. The second layer has been
(Continued)

applied at least to regions of the first layer, such that the first layer is disposed between the substrate and the second layer.

11 Claims, 5 Drawing Sheets

(51) Int. Cl.
*B41J 2/01* (2006.01)
*B41M 1/00* (2006.01)

(58) Field of Classification Search
USPC .......................................................... 428/205
See application file for complete search history.

(56) References Cited

U.S. PATENT DOCUMENTS

| | | | | |
|---|---|---|---|---|
| 7,625,614 | B2 | 12/2009 | Kamo et al. | |
| 2003/0203135 | A1 * | 10/2003 | Emslander | B41M 5/52 428/32.1 |
| 2005/0153147 | A1 | 7/2005 | Khoultchaev et al. | |
| 2006/0188671 | A1 * | 8/2006 | Kamo | B41M 5/5227 428/32.34 |
| 2011/0223391 | A1 | 9/2011 | Nishimura et al. | |
| 2014/0161986 | A1 | 6/2014 | De Rossi et al. | |
| 2015/0353739 | A1 | 12/2015 | Webster et al. | |
| 2016/0075148 | A1 | 3/2016 | Nakano | |
| 2022/0266615 | A1 * | 8/2022 | Ludwig | C09D 11/54 |

FOREIGN PATENT DOCUMENTS

| | | | |
|---|---|---|---|
| CN | 1518504 | A | 8/2004 |
| CN | 104937047 | A | 9/2015 |
| CN | 105415883 | A | 3/2016 |
| DE | 102007034877 | A1 | 1/2009 |
| EP | 2639075 | | 9/2013 |
| JP | 2008-068453 | A | 3/2008 |
| JP | 2013-043894 | A | 3/2013 |
| KR | 10-2002-0016504 | A | 3/2002 |
| RU | 2015104348 | A | 8/2016 |
| WO | 02/85638 | A1 | 10/2002 |
| WO | 2014/010710 | A1 | 1/2014 |
| WO | 2018/143964 | | 9/2018 |

OTHER PUBLICATIONS

Office Action issued in Chinese patent application No. 202080039529.8, Aug. 29, 2022, 29 pp. w/ translation.

Authorized Officer: Ponsaud, Philippe, International Search Report issued in counterpart PCT application No. PCT/EP2020/064438, Aug. 2, 2020, 2 pp.

Office Action issued in Russian Patent Application No. 2021138898, Aug. 18, 2023, 9 pp. w/ translation.

Office Action, and English Translation thereof, issued on Jul. 19, 2023 in Chinese Patent Application No. 202080039529.8.

Office Action issued in Chinese Patent Application No. 202080039529.8 on Dec. 20, 2023 and English Translation thereof.

Wu Baodun et al., Papermaking Processes and Equipment, Aug. 31, 2011, China Light Industry Press, pp. 269-270, 1st edition.

Zhang Yixin, Digital Printing Principles and Processes, Jun. 30, 2007, China Light Industry Press, pp. 115-117, 1st edition.

* cited by examiner

METHOD FOR LACQUERING SUBSTRATES, AND LACQUERED SUBSTRATES

FIELD OF THE INVENTION

The invention relates generally to a method of lacquering paper and paperboard substrates for production of lacquers having high surface qualities and to correspondingly lacquered substrates. The invention specifically relates to a method of lacquering substrates having surfaces that are not completely coherent by means of inkjet methods and to correspondingly lacquered substrates.

BACKGROUND

Printed products are frequently provided with one or more lacquer layers. The lacquer layers here ensure a high-quality optical and tactile impression. A large group of printed products here, for example in the form of print media or packaging, has graphics paper or paperboard as substrates.

Paper is manufactured from textile and plant fibers, optionally by additional sizing. The fibers absorb liquids (e.g. ink). The sizing reduces absorptivity, but does not suppress it completely.

Therefore, paper can absorb liquids, for example including printing ink, to a certain degree. This has an adverse effect on the quality of the printed image of a corresponding print. In order to reduce penetration of the color into the surface of a paper or paperboard to be printed, therefore, what are called coated substrates are used in the case of high-quality prints, for example in the case of illustration printing paper.

Coated papers or paperboards are understood here to mean paper or paperboard, the surface of which has been provided with a highly filled binder layer. This coating, also referred to as slip, here may have one or more plies and reduces the penetration of printing ink into the surface of the substrate, and smooths the surface of the paper or paperboard by the filling of the depressions between the fibers. The coating slip here contains inorganic particles as filler in an organic binder. On account of the high filler level of the paper coating slip, the particles in the layer are not fully wetted by binder. The drying and the associated reduction in volume of the slip allows the particles to protrude far from the surface. The proportion of protruding particles is greater in the case of substrates with a matt coating than in the case of substrates with a glossy coating. The glossiest paper or paperboard is called cast-coated paper or paperboard. The binder here is itself very glossy. Nevertheless, in cast-coated paper, the particles at the surface are not all entirely covered.

In the case of coated substrates, on account of the particulate structure of the coating slip, it is possible for what are called undercuts to form, where the particle surface is not fully surrounded by binder. The undercuts thus form cavities within the layer when viewed vertically from above. In addition, cavities can be formed as a result of incomplete coverage of substrate pores. These cavities are not completely filled with color or lacquer in printing and lacquering processes. Instead, they are wholly or partly covered by color or lacquer layers during the application. In the course of drying, they can partly open up again as a result of the decrease in volume of the binder in the color or lacquer or simply through tearing of the layer. Quite fundamentally, in all printing methods, as is already the case in paper coating, it is not possible to create an entirely pore-free layer, and so the cavities mentioned are fundamentally to be expected.

As a result of these cavities, in the lacquering of coated paper or paperboard by means of inkjet printing, depending on the amount of lacquer applied, small craters may occur on the surface. These are formed because, in the inkjet method, tiny droplets are thrown onto the substrate surface, and these try to reduce their surface tension when they hit the substrate surface. If a liquid film of the same liquid is already present on the substrate surface, the film is pulled upward by approaching droplets on first contact between droplets and film, i.e. pulled away from the substrate surface, before the droplet is ultimately accommodated on the surface. If the above-described undercuts are present here beneath the point of incidence of the droplet, it may be the case when the approach occurs that the material is also pulled upward to such an extent as to form a channel to the trapped air in the cavity of the undercut, which remains open to the liquid surface. These channels to the undercuts are generally referred to hereinafter as pinholes. The pinholes remain here in the lacquer layer as the lacquer cures and constitute visually apparent defects in the lacquer. The effect of the surface tension of the liquid lacquer is that the pinholes have an ever greater diameter in the upward direction with increasing layer thickness. Although a number of pinholes decreases with increasing layer thickness, they are ever more readily visible on account of their greater diameter. In the case of inkjet printing too, especially with UV-curing colors, the pinholes described constitute a serious problem.

The graphics industry to date has usually employed lacquering methods in which the lacquer is transferred to the substrate by roll application. Alternative lacquering methods are by screen printing or pad printing. In the methods described, the lacquer is transferred by a contact method. In this method, the above-described undercuts are covered virtually completely with the lacquer. The tool (the roll, the screen etc.) is raised from the substrate in the process. This separates the liquid film between tool and substrate, and corresponding structures occur at the surface. These structures, even in the case of incomplete coverage of the defects inherent to the substrate, have the effect that any pinholes formed are not so clearly apparent in the layer. Only in the case of high layer thicknesses and sufficiently slow processing speeds, for example in the case of screen printing, can these structures run again, and a very smooth surface is formed. If only partial, laterally structured lacquering of the substrate surface is desired, it is necessary to use correspondingly structured printing plates.

A different method of applying a lacquer layer to coated substrates envisages lamination of the substrate with a polymer film. This very substantially covers the undercuts and creates a surface coating largely free of visually apparent defects. If pores nevertheless remain between the film and the substrate, or relatively large particles are incorporated into the adhesive layer beneath the film, these defects are also visually apparent in the case of film lamination. Moreover, film lamination requires a special laminating apparatus. A further disadvantage is that the film applied typically has a thickness of at least 10 μm. The comparatively thick coating produced with these films significantly influences the properties of the substrate, especially the tactile properties thereof.

Another means of creating a defect-free lacquer layer without pinholes on coated substrates is described in patent application DE 102 007 034 877 A1. A coating composition is first applied here to the substrate by means of inkjet printing, and then the coated surface is treated with an air knife. This minimally deflects the coating composition laterally. The effect of this is that, in the pinholes present, the air tube of the crater is broken and the crater fills with coating composition from the bottom. The pinholes are thus closed. After the pinholes have been eliminated, the coating composition is then cured to give the lacquer. However, a special apparatus is required for the purpose.

SUMMARY

It is thus an object of the invention to provide a method that enables lacquering, especially lacquering by means of inkjet printing, of a substrate for creation of coatings having high surface quality irrespective of the surface structure and characteristics thereof. In addition, it is a further object of the invention to provide a formulation and a correspondingly lacquered printed product having high surface quality.

The object of the invention is already achieved by the subject-matter of the independent claims. Advantageous configurations and developments are the subject of the dependent claims.

The invention relates to a method of producing a printed product comprising at least the following method steps a) to d):

a) providing an optionally already printed print substrate,
b) applying a first layer to at least one surface of the substrate, wherein the layer has organic functional groups,
c) curing the layer applied in step b) by thermal or UV crosslinking of the functional groups to create the sealing layer, wherein the cured first layer has a layer thickness in the range from 1 to 10 μm,
d) applying a second layer to the surface of the first layer.

The layer cured in step c) has a layer thickness in the range from 1 to 10 μm. This layer thickness ensures that the coating is sufficiently thick, such that undercuts and pores are covered and are not passed on to the lacquer layer applied in the subsequent step d). It is also possible for other properties of the substrate or of the substrate surface that are disadvantageous in the lacquering operation, for example high roughness, high porosity or excessive surface tension, to be compensated for or neutralized by the layer cured in step c), such that the lacquering effected in step d) is not influenced by the specific surface properties of the substrate. Thus, for the coating process effected in step d), the original substrate properties are replaced by the corresponding properties of the sealing layer. Irrespective of the particular substrate, this enables reproducible coating properties. The first layer cured in step c) is therefore also referred to hereinafter as sealing layer.

In one development of the invention, step d) is preceded by printing of the substrate provided with the first layer. In one embodiment of this development, the printing is effected atop the cured first layer, i.e. after step c). Alternatively, the substrate may also be printed after step b). In this embodiment, in step c), the first layer is thus cured after the printing. It is thus possible for first layer and print layer to be cured together.

Preferably, in step d), the second layer is applied by means of inkjet printing. By virtue of the layer thickness of the invention and the mechanical stability and strength of the sealing layer, structures such as pores and undercuts as occur in the case of coated paper and paperboard, for example, are still covered such that at least virtually no pinholes, if any, are formed in the inkjet printing effected in step d). The second printing step applied in step d) thus has a coherent surface. A coherent surface in the context of the invention is especially understood here to mean a surface having a pinhole density of less than 10 pinholes per $dm^2$, preferably of not more than 2 pinholes per $dm^2$, more preferably not more than 1 pinhole per $dm^2$. The pinholes are apparent to the naked eye and otherwise considerably distort the printed image. For a truly high-quality print as expected, for example, in the field of packaging for luxury goods, there must be no apparent defects at all on the lacquer surfaces.

The number of pinholes is dependent on the substrate and layer thickness. In the case of lacquering of coated substrates without the sealing layer of the invention, the number of pinholes decreases here with the layer thickness of the lacquer layer. However, a decrease in pinholes is not always associated with an improvement in visual impression since the diameter of the pinholes here also affects their visibility. In the layer thickness range up to about 4 μm, the diameter of the pinholes is very small. They give the visual impression of small particles, as a result of which the resultant layer looks somewhat matt. Between 6-12 μm, the pinholes are very visually apparent. Although the number of pinholes decreases toward higher layer thicknesses, the increase in size of the craters at higher layer thicknesses means that the remaining pinholes distort the appearance much more significantly. Only over and above (substrate-dependent) layer thicknesses of about 20 μm do the pinholes disappear completely.

By contrast, the layer thickness of the sealing layer is so low that the tactile properties of the substrate are at least not significantly affected by the sealing layer, if at all. For example, a substrate coated with a sealing layer of the invention can still be identified as paper by tactile means. By contrast, in the case of a correspondingly laminated paper, the tactile properties of the plastic coating are generally dominant. A particularly advantageous layer thickness of the sealing layer has been found here to be in the range from 1 to 5 μm and especially from 2 to 3 μm.

The sealing layer may also, in one variant, be configured to be unremarkable not just in a tactile sense but also in a visual sense. For instance, the sealing layer, in one embodiment, has high transparency and zero or only low intrinsic color. More particularly, the sealing layer results in only a very small shift in the color locus, if any, of the substrate beneath, such that the visual appearance of the substrate is also affected only to a very minor degree, if at all, by the sealing layer. This may be advantageous especially in embodiments in which the second layer takes the form of a transparent lacquer layer and/or in embodiments in which the second layer is laterally structured and hence is applied solely to parts of the area of the substrate provided with the sealing layer.

If, however, the substrate quality is such that an above-described coating quality cannot be achieved with the layer thicknesses mentioned, it may also be necessary to increase the layer thickness of the sealing layer. In economic terms, this can still mean a distinct advantage over lamination, since poorer substrate qualities become amenable to a high-quality finish even if the tactile properties of the substrate are distinctly altered, especially when radiation-curing sealing layers are used.

In one embodiment of the invention, in a step preceding step a), a slip is applied to at least one surface of the print substrate provided in step a). A slip is understood here to mean a coating composition having a high proportion of inorganic particulate fillers in an organic binder. More particularly, the substrate provided in step a) is a coated paper or coated paperboard.

In an alternative embodiment, the substrate provided in step a) is an uncoated paper or uncoated paperboard. Such substrates have clear surfaces. These feature high porosity and can therefore absorb liquids to a certain degree. As a result, uncoated paper and paperboard is suitable only to a limited degree, for example, as substrate for inkjet printing methods, especially with UV-curable printing inks. By contrast, the sealing layer of the invention completely covers the pores and hence completes the surface.

The sealing layer additionally provides a surface having homogeneous surface properties, such as homogeneous surface tension. This enables, for example, homogeneous levelling properties of inks or coating compositions applied by inkjet printing. If, for example, a substrate is printed with offset printing inks, the regions with the hydrophobically modified offset printing inks have an entirely different surface tension than the unprinted substrate. If lacquering is effected across the transition between unprinted and printed regions, especially by the inkjet method, the running of the lacquer on the unprinted substrate will differ from that on the printed substrate, which results in a step in the appearance of the lacquer at the transition. This effect can also worsen the lacquering results on surfaces that are intrinsically already coherent. The process of the invention is therefore likewise suitable for coating of substrates having coherent surfaces, for example of plastics. The required layer thickness here is much smaller and may be less than 1 μm, since it is not necessary here for the sealing layer to cover and close structures on the substrate surface, for example pores or undercuts.

In one embodiment of the invention, the first layer is cured/crosslinked in step c) by UV radiation or electron beams. The advantage of the radiation-curing formulations is the possibility of dispensing with solvents. Therefore, in the case of radiation-curing formulations, the first layer on curing has only very low volume shrinkage. The reduction in volume here is attributable solely to polymerization shrinkage in the course of crosslinking. On account of the small loss of volume or mass as a result of the curing process that proceeds in step c), the layer thickness of the first layer applied in step b) is thus not significantly reduced, if at all, in the method of the invention. It is thus ensured that the undercuts covered by the first layer applied in step b) are not opened again during the curing process.

The method of the invention, prior to the lacquering step d), provides the substrate with a cured first layer as sealing layer that covers the undercuts and pores in substrates. Furthermore, the sealing layer provides a coherent surface having very good printability on account of its layer properties such as roughness, homogeneity, surface tension or polarity. It is thus possible by the method of the invention, irrespective of the substrate provided in step a) or its surface properties, to coat the latter by means of inkjet printing. The cured first layer effectively “neutralizes” the surface of the substrate. It is thus also possible to lacquer or print substrates, for example inexpensive substrates or those that are comparatively unsuitable for lacquering, which, on account of their surface properties, especially on account of their high surface roughness, can be over-lacquered only with difficulty, if at all, by the known methods.

In one development of the invention, the first layer or sealing layer is applied in laterally structured form to the surface of the substrate provided in step a). What this is understood to mean is more particularly that only regions of the substrate surface are coated with the sealing layer. In this development, in step d), the second layer is applied only part-regions of the sealing layer.

The formulation applied in step d) is preferably applied to the first layer by means of inkjet printing. Inkjet printing here is a flexible and inexpensive coating method. For example, it is possible in step d) to apply the formulation applied in a laterally structured manner and hence to lacquer the substrate only in particular surface regions without any need for special printing plates for the purpose. The formulation here preferably contains monomers, oligomers and/or prepolymers having at least one crosslinkable group. Particularly advantageous crosslinkable groups here have been found to be acrylates, methacrylates or epoxides. Vinyl esters are also suitable for this application.

The crosslinking of the crosslinkable groups and hence the crosslinking of the second layer is preferably effected here in a step downstream of step d). More particularly, the second layer can be crosslinked by UV radiation, electron beams or thermal treatment. The cured second layer is the lacquer layer. The lacquer layer may take the form here of a matt lacquer or gloss lacquer.

In step b), the first layer, in one embodiment of the invention, is obtained by deposition of a formulation. The formulation for production of the first layer here contains at least one monomer, oligomer or prepolymer having at least one crosslinkable functional group, and a reactive diluent. Monomer, oligomer and prepolymers here each contain at least one crosslinkable functional group, and these are crosslinked in step c).

The viscosity of the formulation can be adjusted with the aid of the reactive diluent to the coating method used in step b). For instance, the formulation in step b) can especially be applied by a flexographic printing method, a screen printing method, by intaglio printing, with a roll or by coating bar application. In step b), the formulation is applied uniformly to the surface of the substrate. Preference is given to providing the entire surface of the substrate in step b) with the coating. In this case, for example, surface structures such as undercuts in the substrate are fully covered by the coating formulation.

Since the first layer deposited in step b), in this embodiment, contains a reactive diluent as solvent which is incorporated into the polymer network and hence remains within the layer unlike a conventional solvent, the crosslinking causes only a very small reduction in volume. It is thus ensured that, even after curing, the entire surface of the substrate coated in step b) has been covered with the cured sealing layer. More particularly, the use of a reactive diluent, i.e. a solvent, which is incorporated within the polymer network in the course of curing and hence remains within the layer can avoid cracking or re-exposure of the undercuts.

In one embodiment, the layer deposited in step b) can also be consolidated and smoothed by a calendering process. In this embodiment, in step b), a thermoplastic lacquer system is applied to the substrate surface, cured by drying and subsequently consolidated with a polished stainless steel calender. The lacquer may also contain a crosslinkable group, such that, in step c) of the method of the invention, there is curing of the first layer deposited in step b) in this variant of the invention too. In this case, the thermoplasticity of the layer is reduced.

The lacquer systems used to create the lacquer layer calendered in step b) may, in this case, contain organic solvents or water or be radiation-curing. It has been found to be particularly advantageous here to use hybrid lacquers, also referred to as dual-cure lacquers. These lacquer systems are water-based, but additionally contain binders having unsaturated crosslinkable acrylate groups. In order to obtain a calenderable lacquer, step b) after the application of the coating composition, water and volatile solvents are removed therefrom by drying.

The resultant lacquer has high thermoplasticity and can thus be efficiently calendered in step b). In step c), UV curing is then effected by crosslinking of the acrylate groups. This leads to a high mechanical stability and to a reduction in the thermoplasticity of the cured sealing layer. However, in this embodiment, the first layer deposited, even before the UV curing, has sufficiently high mechanical stability, such that it is printable by means of inkjet methods without opening up the undercuts during the printing process. There is therefore no absolute need for intermediate UV drying before any further coating step. In one development of this embodiment, the UV curing of the first layer deposited can therefore be effected together with the curing of the second layer deposited. In this development, step d) thus precedes step c).

Substrates with calendering lacquers as sealing layer have particularly smooth surfaces. In one embodiment of the invention, the surface of the substrate treated in this way is sufficiently smooth that, when the surface is rendered reflective, the observer's mirror image is readily apparent and not significantly distorted by surface corrugation. Therefore, correspondingly coated substrates are particularly suitable for the application of coatings in the form of colors or lacquers, where particularly sharp contours and high brightness are important. In one embodiment of the invention, therefore, the second layer deposited in step d) contains what are called VMP colors, i.e. colors based on vacuum-metallized pigments. This may be, for example, a printing ink that develops high metallic gloss after printing. In these colors, the pigments are in platelet form as “flakes”. A uniform alignment of the platelets leads here for a high brightness of the area generated with the color. The uniform alignment of the platelets is promoted here by a very smooth surface. In one development, the layer deposited in step d) has a mirror effect. The correspondingly coated substrates are suitable, for example, as substitute for vacuum-metallized foils where high metal gloss is achieved. If the same printing ink is applied to one only having an above-described sealing layer without calendering, the substrate unevenness means that a shiny but uneven layer is the result, where the mirror image is slightly distorted. When silver printing inks of the type described are applied to uncoated substrates, the lack of alignment of the pigments and the partial absorption by the printing ink produces a grey color layer. Also digital film embossment, in which the layer deposited in step d) is an adhesive which, in the case of subsequent calendering with an embossing film suitable for the purpose, takes on a metallically shiny surface.

In one development, in step b), a hybrid lacquer is deposited as the first layer with the aid of a slot die, or what is called a Mayer bar. Alternatively, the hybrid lacquer may also be applied by a roll coating method to the substrate provided in step a). In this way too, high-gloss surfaces are obtained.

Alternatively, the formulation applied in step b) may comprise isocyanate-crosslinking systems, polyurethanes, epoxy systems, acrylates, methacrylate, polyvinyl ethers, polyesters based on maleic acid and fumaric acid, styrene compounds or silicone acrylates.

In step b), the formulation for production of the first layer may especially be applied to the substrate provided in step a) by a flexographic printing method, a screen printing method, by intaglio printing, with a roller, by coating bar application, with a Mayer bar, with a slot die or by means of curtain coating. Alternatively, the layer deposited in step b) may also be a full-area roll coating.

In one development of the invention, the formulation for production of the first layer additionally contains inorganic or organic particles. The formulation here especially has a solids content in the range from 2% to 40% by weight, preferably in the range from 5% to 25% by weight. In one embodiment, the formulation contains polymer particles composed of polyolefins, polyacrylates, polyamides and the like, talc particles, silicate particles and/or carbonate particles, especially talc particles. The particles have a matting effect, such that the from the corresponding produced sealing layer has low gloss. Furthermore, the corresponding sealing layers have a particularly homogeneous and coherent surface. This is especially achieved through the interaction of inorganic particles and the liquid, UV-curable components of the formulation. For instance, the inorganic particles present in the formulation lead to an increase in structural viscosity. More particularly, it is suspected that the particles increase the cohesion forces within the formulation. The effect of this is that the formulation forms a coherent liquid film. The coherent surface of the film is also opened up here only to a minor degree, if at all, in the course of the applying operation. Correspondingly, surface defects and undercuts on the substrate surface are covered virtually completely. Since formulations comprising inorganic particles form particularly stable films, the inventive function of the sealing layer is assured even in the case of very low layer thicknesses. On account of the elevated structural viscosity, the corresponding formulations are especially also suitable for application methods in which the film is subject to high adhesion forces, for example flexographic printing.

The invention further relates to a printed product comprising a substrate with a first layer and a second layer, wherein the first layer and the second layer comprise an organic crosslinked lacquer and have a coherent surface. The first layer, also referred to hereinafter as sealing layer, here is transparent and preferably colorless. It is thus visually unremarkable and affects the visual appearance of the substrate only to a minor degree, if at all. The layer thickness of the sealing layer is in the range from 1 to 10 μm. This at least partly levels out unevenness, and covers and hence compensates for undercuts or pores in the substrate with the material of the sealing layer. At the same time, the tactile properties of the substrate are largely maintained. In a preferred embodiment, the cured sealing layer has a layer thickness in the range from 1 to 5 μm, more preferably in the range from 2 to 3 μm.

The second layer has been applied to the sealing layer, such that the second layer is separated from the substrate surface by the sealing layer. The second layer thus does not have any contact with the substrate surface. The second layer here may cover the entire surface of the sealing layer. Alternatively, the second layer may also be disposed only in regions, i.e. in laterally structured form, on the surface of the sealing layer.

In one embodiment of the invention, the first layer contains a polymer layer crosslinked by radiative curing, an isocyanate-crosslinking system, a polyurethane, an epoxy system, an acrylate, a methacrylate, a polyvinyl ether, a polyester based on maleic acid and fumaric acid, styrene compounds and/or silicone acrylates.

In one embodiment, the second layer is a digital print that has preferably been applied by means of inkjet methods. The second layer preferably has a defect-free surface, a defect-free surface especially being understood to mean a surface having a pinhole density of less than 10 pinholes per $dm^2$, preferably of not more than 2 pinholes per $dm^2$ and more preferably not more 1 pinhole per $dm^2$. The pinholes are apparent to the naked eye and considerably distort the printed image. For a truly high-quality print as expected, for example, in the sector of packaging for luxury goods, no defects at all must be apparent on the lacquer surfaces.

In a further embodiment of the invention, the first layer and the second layer have been applied to the substrate in a laterally structured manner, with the second layer disposed over the entire surface of the sealing layer. In one embodiment of the invention, the second layer, at least over part of the area of the substrate provided with the sealing layer, forms a contiguous area with a coherent surface, where preferably at least 50%, more preferably at least 70%, of the total surface areas covered by the second layer forms a common contiguous area.

Alternatively, the second layer has been applied to part-areas of the first layer in a laterally structured manner. For instance, the second layer may be applied in the form of lines, letters and/or symbols atop the first layer. In this case, the corresponding printed image of the second layer preferably has a minimum line width of more than 1 mm, preferably of more than 2 mm.

In a further embodiment, the second layer is disposed atop the first layer in a laterally structured manner, and the first layer and the second layer differ in their level of gloss. In this way, it is possible to achieve gloss and matt effects in individual regions of the printed product. Both variants are useful here. Either the first layer has a higher level of gloss than the second, or vice versa.

In one embodiment of the invention, the substrate has a binder-containing particulate coating at least on one surface and the first layer has been applied atop the binder-containing particulate coating. In this embodiment, the substrate preferably comprises a coated paper or a coated paperboard. Alternatively, the substrate is an uncoated paper or an uncoated paperboard.

BRIEF DESCRIPTION OF THE DRAWINGS

The invention is described in detail with reference to working examples and with reference to FIGS. 1 to 14. The figures show.

DETAILED DESCRIPTION

Figure 1:
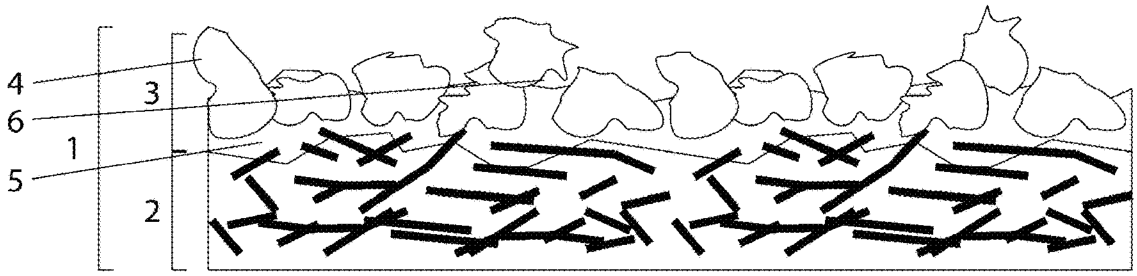
FIG. 1 a schematic diagram of the surface of a coated paper.

FIG. 1 shows a schematic of the surface of a coated paper 1. The paper surface 2 has been coated here with what is called a slip 3. The slip 3 here comprises particulate inorganic fillers 4 that are deposited on the paper surface 2 and are held together by an organic binder layer 5. The paper surface 2 here is not smooth but has unevenness. Moreover, on account of the irregular form of the inorganic fillers 4, what are called undercuts 6 are formed, which likewise cannot be filled by the binder 5.

Figure 2:
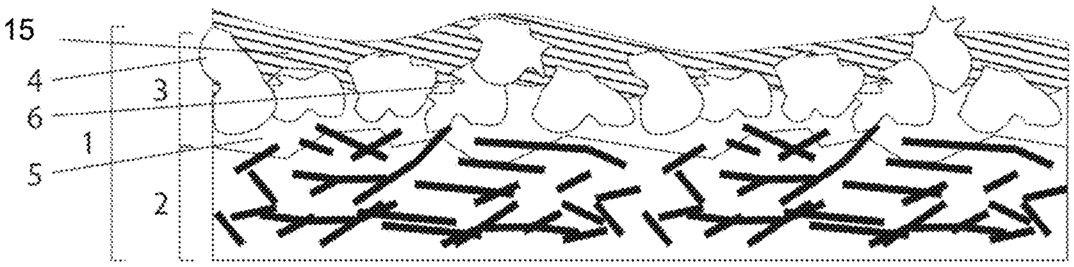
FIG. 2 a schematic diagram of an applied primer layer on the paper shown in FIG. 1, FIG. 3 a schematic diagram of the primer layer applied in FIG. 2 after the drying process, FIG. 4 a schematic diagram of a lacquer layer applied by inkjet methods in the coated paper shown in FIG. 3, FIG. 5 a schematic diagram of a lacquer layer applied by inkjet methods in the coated paper shown in FIG. 2, FIG. 6 a schematic diagram of a working example of the invention with a coated paper as substrate, FIG. 7 a schematic diagram of a lacquer layer applied atop an uncoated paper, FIG. 8 a schematic diagram of a working example of the invention with an uncoated paper as substrate, FIG. 9 a schematic diagram of one embodiment of the sealing layer of the invention, in which the sealing layer has been calendered, FIG. 10 a schematic diagram of one embodiment in which a lacquer layer has been applied to a calendered sealing layer, FIG. 11 a schematic diagram of a working example with a calendered sealing layer and a lacquer layer comprising VMP color pigments, FIG. 12 a microscope image using coaxial incident light of a coated paper lacquered by means of inkjet printing, FIG. 13 a microscope image using coaxial incident light of a coated paper lacquered by means of inkjet printing as a working example with a sealing layer of thickness 2.5 μm, and FIG. 14 a microscope image using coaxial incident light of a coated paper lacquered by means of inkjet printing as a working example with a sealing layer of thickness 4.5 μm.

FIG. 2 shows a schematic of the coated paper shown in FIG. 1, which has been provided with a primer coating composition 15. This can be effected, for example, by a flexographic printing method, a screen printing method, by intaglio printing, with a roll or by coating bar application or curtain coating. Alternatively, the coating may also be a slot die coating or a Mayer bar coating. The primer layer 15 has not yet dried and consists of a formulation that undergoes a certain shrinkage in volume in the course of drying/curing. The as yet undried layer covers the undercuts 6.

Figure 3:
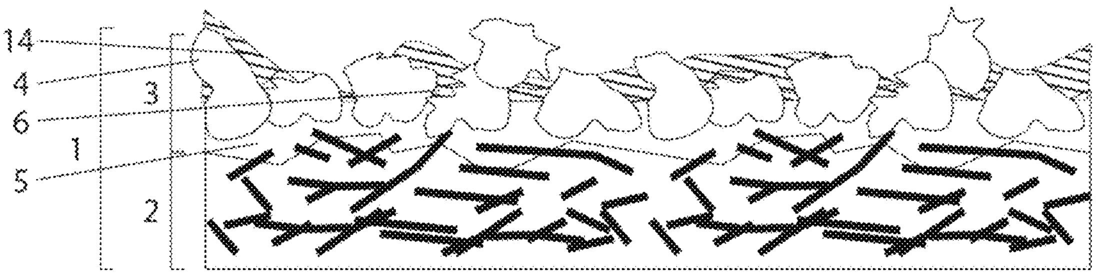

FIG. 3 shows the corresponding primer layer 14 that has been obtained by drying of the coating composition 15 shown in FIG. 2. As a result of the drying process and the associated loss of volume of the coating composition 15, the substrate surface is no longer fully covered by the primer 14 obtained by drying of the coating composition 15. In addition, the drying process also reduces the layer thickness of the primer layer 14 above the undercuts 6, as a result of which the film no longer fully covers the undercuts.

If a corresponding coated paper 1 is coated with a lacquer layer 7 by means of inkjet methods, channels to these defects are formed at undercuts and cavities by the incidence of the inkjet droplets. This is shown in schematic form in FIG. 4 and such that craters, called pinholes 8, form in the deposited lacquer layer 7. These constitute visually apparent defects in the lacquer layer 7, such that the substrate 1 is no longer suitable for surface finishing by means of inkjet coating.

Figure 4:
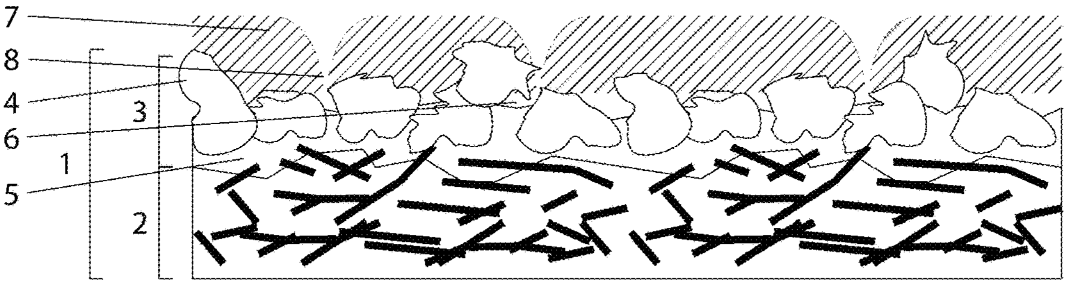

The same effect occurs when the substrate from FIG. 1, as shown in FIG. 2, has been provided with a primer coating composition that has some undercuts again after drying, as shown in FIG. 3. After coating with a lacquer layer by means of inkjet methods, this likewise leads to formation of craters (called pinholes), as shown in FIG. 4.

Figure 5:
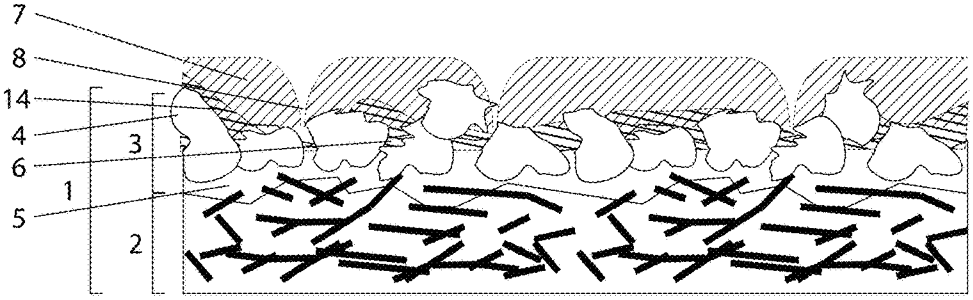

FIG. 5 shows a coated paper 1 which has been provided with a primer layer 14 and then a lacquer layer 7 by means of inkjet methods. The primer layer 14 may, for example, be an aqueous primer. Here, in the drying process, previously covered defects (cf. FIG. 2) were opened up again as a result of volume shrinkage. These defects generate pinholes 8 as defects in the lacquer layer 7 applied above the primer layer.

Figure 6:
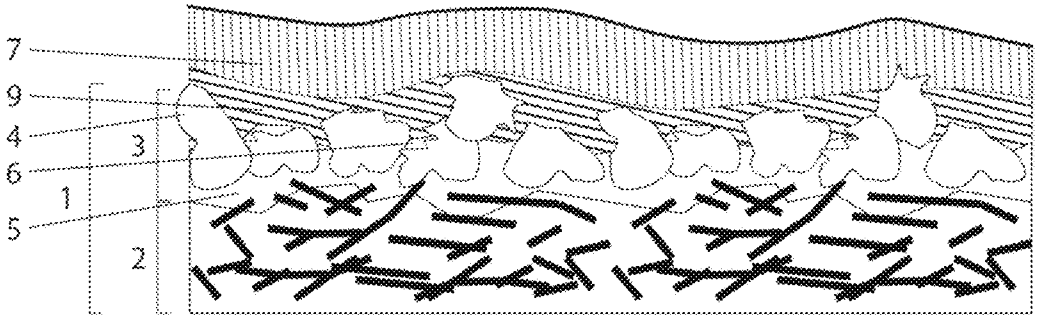

FIG. 6 shows a schematic of a substrate coated in accordance with the invention as a first working example. The lacquer layer 7 was likewise applied by inkjet printing here, except that the surface of the coated paper 1 is fully covered by a sealing layer 9. The sealing layer 9 thus separates the surface of the coated paper 1 from the lacquer layer 7 and covers the cavities in the coated paper that are formed by undercuts 6. Because the undercuts are fully covered, the inkjet coating of the sealing layer 9 cannot form channels atop undercuts. Thus, the lacquer layer 7 does not have any craters or pinholes and is suitable for surface finishing.

For production of the embodiment of the invention shown in FIG. 6, the coated substrate 1 provided is first endowed with a coating composition. This can be effected, for example, by a flexographic printing method, a screen printing method, by intaglio printing, with a roll or by coating bar application or curtain coating. Alternatively, the coating may also be a slot die coating or a Mayer bar coating. The coating composition here contains crosslinkable functional groups. After the coating composition has been applied to the surface of the substrate 1, the coating composition is crosslinked/cured via the crosslinkable functional groups. The crosslinkable groups here are preferably radiation-curing, such that the crosslinking in step c) can be effected with the aid of a UV lamp. In this case, during the crosslinking, there is only a very small reduction in volume of the coating, attributable predominantly to polymerization shrinkage. By virtue of the small reduction in volume during curing, unlike in the case of water-based primers for example (see FIG. 3), there is no tearing of the layer above undercuts that have not been filled completely by the primer liquid, and the cured sealing layer 9 thus has a coherent surface. The cured sealing layer 9 is thus an ideal surface for the inkjet printing process for deposition of the lacquer layer 7.

Figure 7:
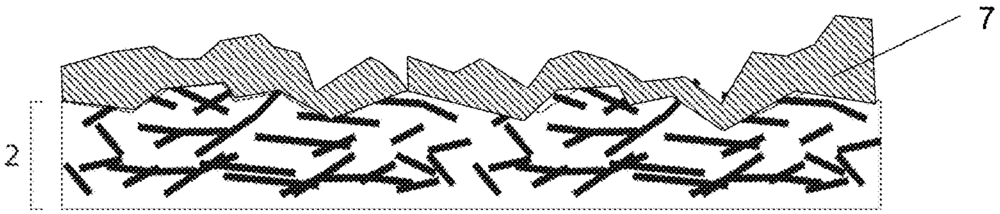

FIG. 7 shows a schematic of an uncoated paper 2 that has been provided with a lacquer layer 7. The surface of the uncoated paper 2 is uneven and porous. As a result of this porosity, a portion of the coating composition for production of the lacquer layer is absorbed by the paper in the period from the application up to the curing of the coating composition via crosslinking or loss of solvent. As a result, the layer on the surface of the substrate becomes increasingly thinner. Since the substrate surface has locally different absorption properties, the coating composition is absorbed to different degrees in the different regions of the substrate surface, such that the coating thickness varies over the substrate surface and the coating thus has a spotty appearance. The substrate 2 is thus unsuitable for surface finishing by inkjet methods.

Figure 8:
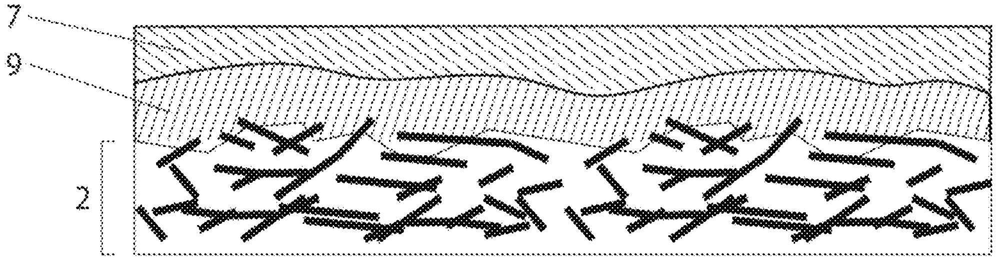

FIG. 8 shows a second working example of a printed product of the invention, wherein the substrate, as in FIG. 3, is an uncoated paper 6. Between the lacquer layer 7 and the paper surface here too is a sealing layer 9 that seals the paper surface and has a cohesive homogeneous surface. Thus, the lacquer layer 7 also has low roughness and a homogeneous cohesive surface.

Figure 9:
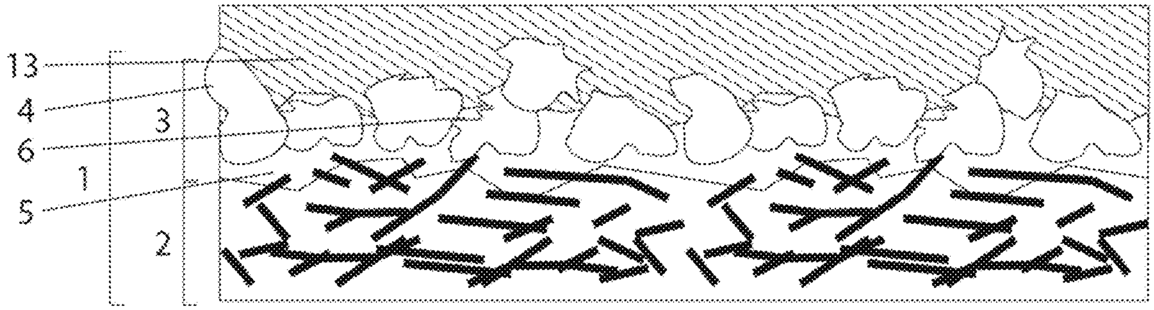
Figure 10:
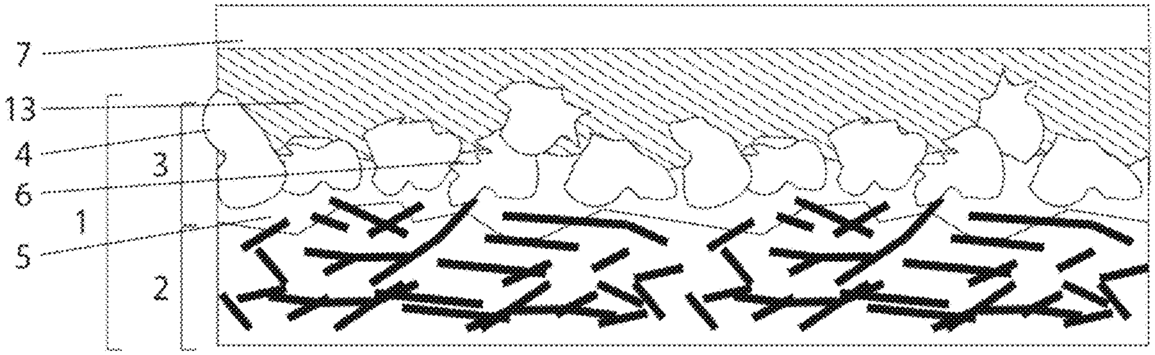
Figure 11:
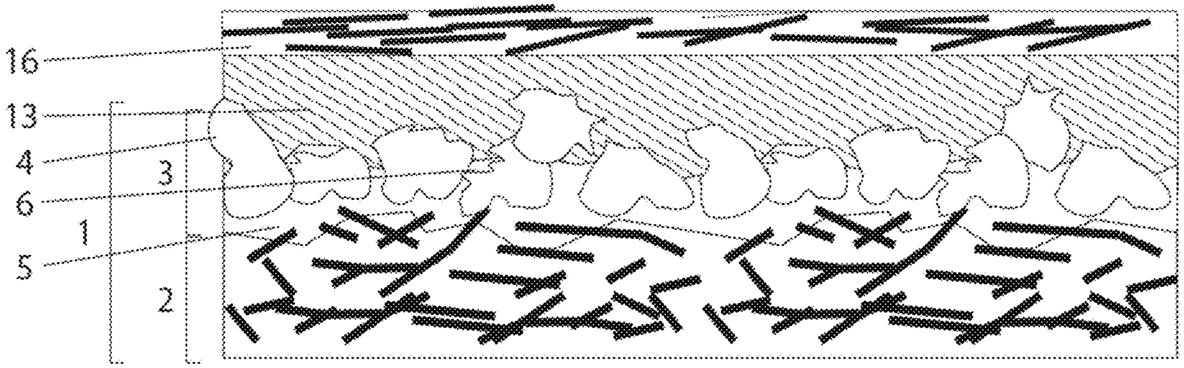

FIGS. 9 to 11 show schematics of embodiments with particularly smooth sealing layers 13. These sealing layers 13 are applied here analogously to the sealing layers 9 shown in FIGS. 6 and 8. However, the coating compositions thus supplied have greater layer thicknesses. In addition, the coating composition in these embodiments, in one working example, comprises what are called dual-cure coating formulations. These coating formulations are water-based and additionally contain radiation-curable functional groups. The application of the coating formulation atop the substrate 1, in this development of the invention, is followed by a drying step. The layer thus obtained is thermoplastic and, just like sealing layer 9 shown in FIG. 6, at least partly reflects the unevenness of the substrate surface. In order nevertheless to obtain an impervious layer with low surface roughness for the inkjet printing process, the dried layer is consolidated and smoothed by calendering. For this purpose, the layer is consolidated with a polished stainless steel calender. The calendered layer 13 thus obtained, even without further crosslinking of the functional groups, has a coherent surface with low surface roughness and sufficiently high mechanical stability for the subsequent finishing.

The lacquer layer 7 shown in FIG. 10 was applied by inkjet atop the layer 13 that is very smooth by virtue of the calendering. It is a feature of the resultant surface quality that the substrate unevenness has been virtually completely balanced out by the calendering and hence an extremely smooth lacquer surface is formed. The curing of the lacquer layer 7 by UV radiation also results in crosslinking of the uncrosslinked radiation-curable functional groups remaining in the calendered layer 13.

FIG. 11 shows an embodiment in which the lacquer layer 16 contains metal pigments in platelet form (VMP colors). By virtue of the very smooth surface of the calendered sealing layer 13, these may be aligned parallel or at least largely parallel to the substrate surface, such that it is possible to achieve a very good mirror effect without distortion resulting from the substrate unevenness.

Figure 12:
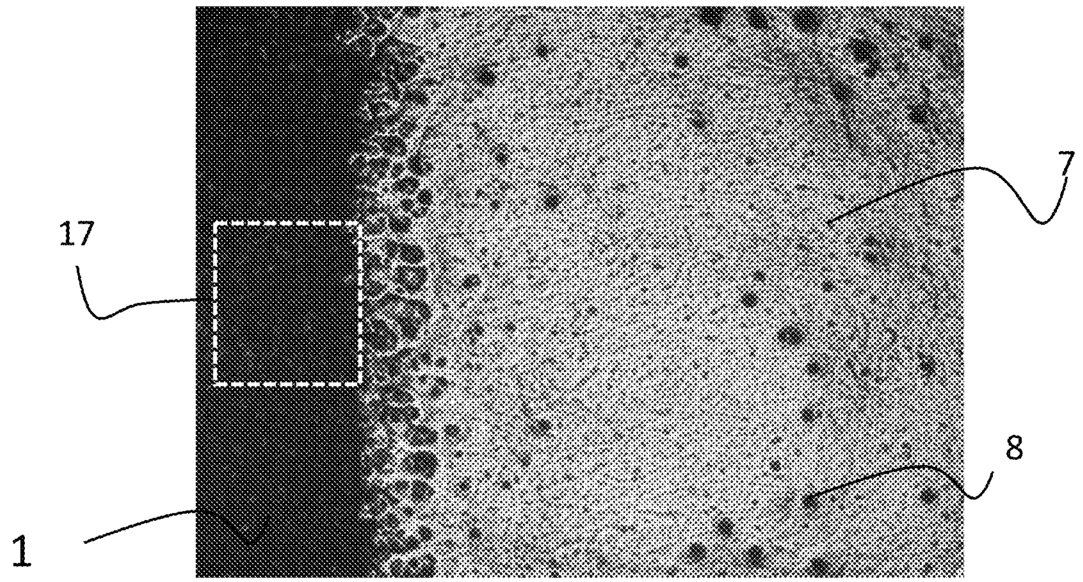
Figure 13:
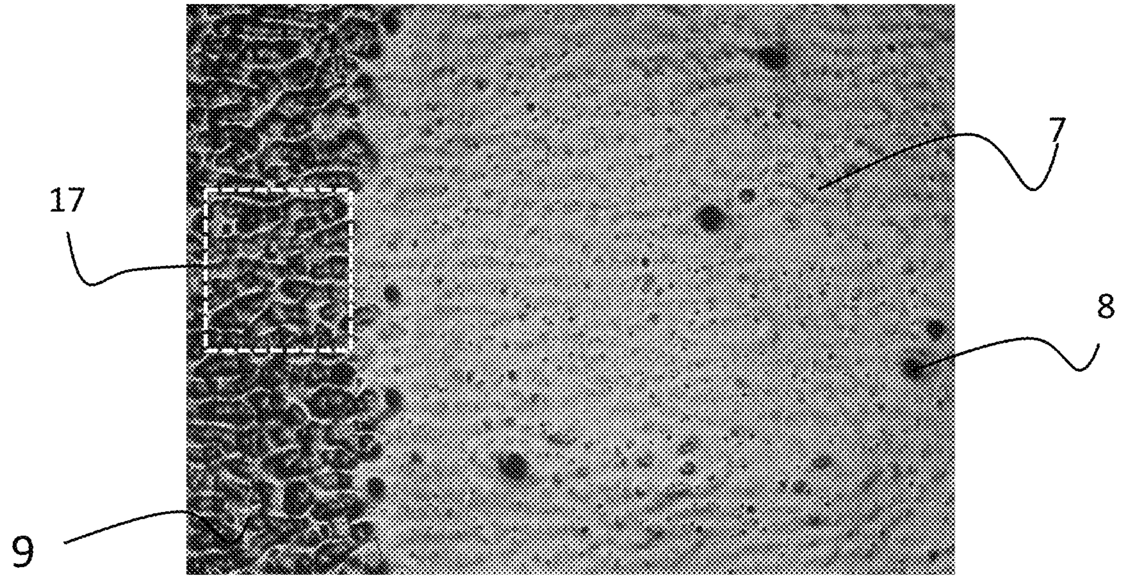
Figure 14:
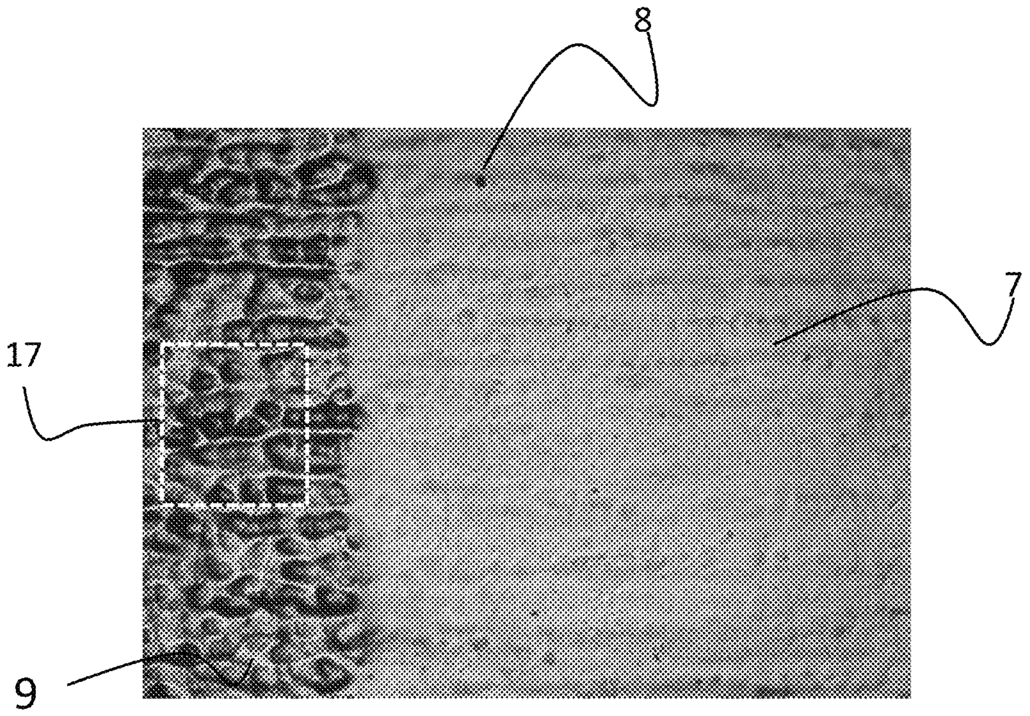

FIG. 12 to FIG. 14 are microscope images with 12-fold magnification with coaxial incident light of various two-dimensional coating specimens on paperboard substrates that have been applied by inkjet lacquering. The samples shown in FIGS. 12 to 13 have the same substrate 1 and the same composition of the lacquer layer 7, and differ by the pretreatment of the substrate before the inkjet lacquering for production of the lacquer layer 7.

The lacquer layer 7 was applied here in a laterally structured manner, such that the region 17 shows the untreated substrate (FIG. 12) or pretreated substrate (FIGS. 13 to 14) without lacquer layer 7. The samples shown in FIG. 12 and FIG. 13 are comparative samples here, without pretreatment of the substrate 1 in FIG. 12 prior to the lacquering operation. The samples shown in FIG. 13 and FIG. 14 are two working examples of the printed product of the invention. Here, in both cases, the lacquering operation was preceded by application of a sealing layer 9. The sample shown in FIG. 12 here has a sealing layer 9 having a layer thickness of 2.5 μm; the layer thickness of the sealing layer of the sample shown in FIG. 13 is 4.5 μm.

While the regions 17 shown in FIG. 12 have high surface roughness, the surface is smoothed by the sealing layer of the samples shown in FIG. 13 and FIG. 14. In addition, FIG. 11 to FIG. 14 shows the influence of a sealing layer on the pinhole density in the lacquer layer. The pinholes 8 are apparent in the figures as dark-colored defects in the form of dots. The pinhole density, i.e. the average number of pinholes 8 per $cm^2$ of coating area, decreases constantly from FIG. 11 to FIG. 14. The highest pinhole density at about $2000/cm^2$ is possessed here by the lacquer layer 7 applied directly to the untreated substrate 1 (FIG. 11) (at a layer thickness of 8 $g/m^2$). The pinholes 8 are created here by lack of coverage or opening of undercuts and pores during the inkjet printing operation. Even a primer layer 18 that was created by application of a corresponding aqueous coating formulation atop the substrate 1 (dry layer thickness about 1 $g/m^2$) cannot effectively prevent the formation of pinholes 8 since the high loss of volume or mass of the coating composition in the drying process results in partial exposure of the undercuts and pores again. By contrast, the working examples shown in FIG. 12 and FIG. 13 have significantly smaller pinhole densities of $25/cm^2$ (FIG. 12) and $<1/cm^2$ (FIG. 13) respectively. This is attributable to the sealing layer 9 of the invention, by which undercuts and pores in the substrate 1 are covered permanently. This advantageous effect of the sealing layer 9 is dependent on the layer thickness thereof and increases with increasing layer thickness.

REFERENCES

1 substrate
2 paper
3 slip
4 inorganic filler
5 binder
6 undercut
7 lacquer layer
8 pinhole
9 sealing layer
13 calendered layer
14 aqueous primer
15 coating composition
16 color with VM pigments
17 uncoated region

The invention claimed is:

1. A method of producing a printed product comprising the steps of:

a) providing a print substrate, wherein the print substrate comprises a paper or paperboard, wherein a particulate coating comprising inorganic fillers in an organic binder is applied as a slip on at least one surface of the paper or paperboard, b) applying a formulation for production of a first layer as a sealing layer to at least one surface of the substrate, wherein the formulation for production of the first layer is applied on a top of the particulate coating, and wherein the formulation for production of the first layer comprises at least one monomer, oligomer or prepolymer having at least one crosslinkable functional group and the formulation for production of the first layer comprises coating materials from the group having the elements of isocyanate-crosslinking systems, polyurethanes, epoxy systems, acrylates, methacrylate, polyvinylethers, polyesters based on maleic acid and fumaric acid, styrene compounds and silicone acrylates, c) curing the first layer applied in step b), wherein the cured first layer has a layer thickness in the range from 1 to 10 μm, and d) applying a second layer to the surface of the first layer created in step c), wherein the second layer applied in step d) has a complete surface in printed regions.

2. The method as claimed in claim 1, wherein the first layer has a thickness in the range from 1 to 5 μm.

3. The method as claimed in claim 1, wherein the formulation for production of the first layer contains at least one monomer, oligomer or prepolymer having a crosslinkable group, and the sealing layer is obtained in step c) by crosslinking the functional groups.

4. The method as claimed in claim 3, wherein the deposited layer is crosslinked in step c) by UV radiation, an electron beam or thermal treatment and/or the formulation applied in step b) contains a reactive diluent as solvent.

5. The method as claimed in claim 3, wherein the layer deposited in step b) is cured and subsequently calendered before step d), wherein the cured layer is thermoplastic.

6. The method as claimed in claim 5, wherein step c) follows after step d) and, in step c), a calendered layer is crosslinked together with the layer deposited in step d).

7. The method as claimed in claim 1, wherein, in step b), the formulation for production of the first layer is applied by a flexographic printing method, a screen printing method, by intaglio printing, with a roller, by coating bar application, with a Mayer bar, with a slot die or by curtain coating to the substrate provided in step a), or the layer deposited in step b) is a full-area roll coating.

8. The method as claimed in claim 1, wherein, in step d), the formulation is applied as the second layer to the surface of the first layer by inkjet printing.

9. The method as claimed in claim 1, wherein, after step d), the layer deposited in step d) is crosslinked.

10. The method as claimed in claim 1, wherein the second layer is a matt or gloss lacquer.

11. The method as claimed in claim 1, wherein the first layer has a thickness in the range from 2 to 3 μm.

* * * * *